March 31, 1936.   R. N. BURCKHALTER ET AL   2,035,530
OIL FILTER
Filed July 11, 1932
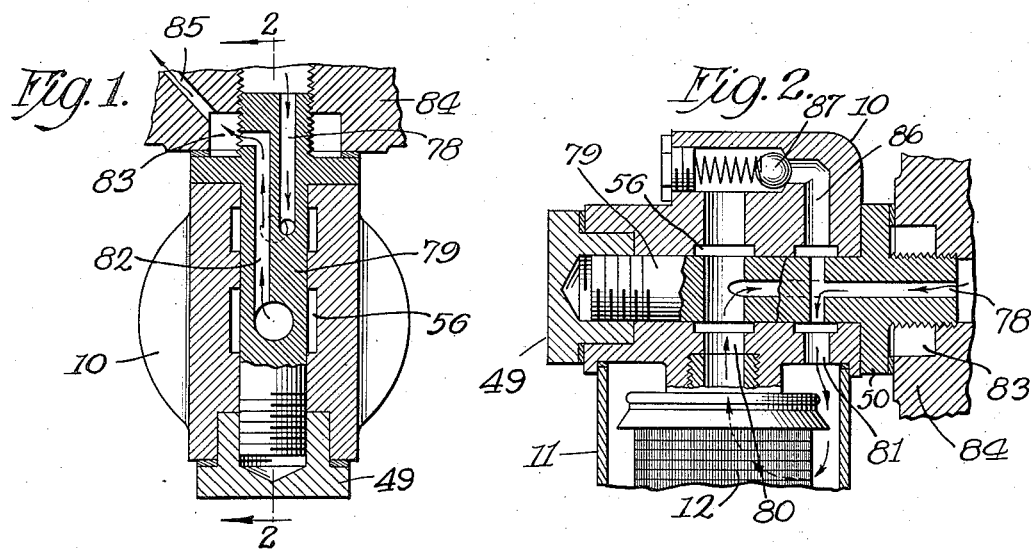
Inventors
Robert Nash Burckhalter
James Marshall Osburn
By Gilson, Mann & Cox, Attys.

Patented Mar. 31, 1936

2,035,530

UNITED STATES PATENT OFFICE 2,035,530

OIL FILTER

Robert Nash Burckhalter and James Marshall Osburn, Michigan City, Ind., assignors to Michiana Products Corporation, Michigan City, Ind., a corporation of Indiana Application July 11, 1932, Serial No. 621,904

3 Claims. (Cl. 210—165)

The principal object of this invention is to simplify the mounting of an oil filter on the crank case of an engine, or other support, and to provide oil connections suited to a wide range of requirements.

In the main, this is accomplished by using a single properly located bolt for mounting the filter on the support and so locating the oil passages that the inlet and outlet connections may be made by boring the bolt. Thus, where it is desired to have no exposed pipe, a single bolt having two bores in it will secure the filter to the support and also provide inlet and outlet connections.

Fig. 1 is a plan section through the filter base, and showing a detail of a wall to which the base is secured; and Fig. 2 is a sectional view on the line 2—2 of Fig. 1.

But these forms are merely illustrative embodiments of the invention, which may take other forms suited to particular uses.

The general form of the filter is not of the essence of the invention. It is shown as comprising a casing 11, suitably attached to a base 10, having outlet and inlet passages 80, 81, communicating with the chamber of the casing within which a filtering element 12 is housed, such element being between the passages. The base 10 has a through bore for the accommodation of an attaching bolt 79, threaded at its inner end and having a lateral flange 50 adjacent thereto for engaging a suitable bolt-hole in the outer face of a wall, such as 84, which may be the wall of the crank case of an internal combustion engine. To the outer threaded end of the bolt 79 is applied a suitable binding nut for clamping the base 10 to the lateral flange 50.

The bolt 79 has two longitudinal ducts 78 and 82, the former opening through its inner end and the latter opening laterally adjacent to such end and communicating with a duct 85 leading through the inner face of the wall 84, from which duct the oil may be conveyed as may be desired. Both of the ducts 78, 82, open laterally at their inner ends to communicate the one with the passage 81 and the other with the passage 80. A by-pass 86 in the base 10, controlled by a pressure regulating spring-closed check valve 87, connects the inner end of the ducts 78, 82, the bore for the bolt 79 being preferably enlarged, as shown at 56, adjacent such ends.

Oil entering the base through the duct 78 passes into the casing 11 by the passage 81, thence through the filter element 12, and makes its exit through the passage 80 and duct 82. Should the oil be delivered to the device at greater pressure than is desirable for the service to be performed after filtering, the valve 86 is unseated and enough oil passes through the relief duct 85 and directly to the outlet duct 82 to suitably reduce the pressure.

The form of the parts and the detail arrangement thereof, and of the passages, may be varied as desired within the scope of the appended claims.

We claim as our invention:

1. An oil filter comprising a hollow filter element, a shell enclosing the element, a base having a passage communicating with the shell outside of the element, and a passage communicating with the inside of the element, and also having a centrally located bore, transverse to the last mentioned passage, a bolt fixed in the bore and having a threaded portion projecting laterally to mount the filter on a support, such bolt having passages opening through its inner end portion and communicating, respectively, with the named base passages.

2. A filter comprising a base having inlet and outlet passages, a filter element between the passages, a bolt setting through the base to attach it to a support, the bolt having inlet and outlet passages opening through its inner end portion and communicating with the named passages of the base.

3. A filter comprising a base having inlet and outlet passages, a filter element between the passages, a bolt setting through the base to attach it to a support, the bolt having inlet and outlet passages opening through its inner end portion and communicating with the named passages of the base, the base being also provided with a check-valve controlled by-pass connecting the bolt passages.

ROBERT NASH BURCKHALTER.
JAMES MARSHALL OSBURN.